(12) United States Patent
Ellison

(10) Patent No.: US 11,473,950 B2
(45) Date of Patent: Oct. 18, 2022

(54) METHOD AND APPARATUS FOR ASSESSING FLUID FLOW

(71) Applicant: EXNICS LIMITED, Aberdeen (GB)

(72) Inventor: Stuart Ellison, Aberdeen (GB)

(73) Assignee: EXNICS LIMITED, Aberdeen (GB)

( * ) Notice: Subject to any disclaimer, the term of this patent is extended or adjusted under 35 U.S.C. 154(b) by 219 days.

(21) Appl. No.: 16/642,803

(22) PCT Filed: Sep. 3, 2018

(86) PCT No.: PCT/GB2018/052486
§ 371 (c)(1),
(2) Date: Feb. 27, 2020

(87) PCT Pub. No.: WO2019/043409
PCT Pub. Date: Mar. 7, 2019

(65) Prior Publication Data
US 2021/0381865 A1    Dec. 9, 2021

(30) Foreign Application Priority Data

Sep. 1, 2017 (GB) ..................... 1714069

(51) Int. Cl.
*G01F 1/663* (2022.01)
*E21B 47/001* (2012.01)
*G01F 1/661* (2022.01)
*E21B 47/107* (2012.01)

(52) U.S. Cl.
CPC ............ *G01F 1/663* (2013.01); *E21B 47/001* (2020.05); *G01F 1/661* (2013.01); *E21B 47/107* (2020.05)

(58) Field of Classification Search
CPC ........ G01F 1/661; G01F 1/663; E21B 47/001; E21B 47/107
(Continued)

(56) References Cited

U.S. PATENT DOCUMENTS 5,353,627 A     10/1994 Diatschenko et al.
2002/0064331 A1*  5/2002 Davis ..................... G01F 1/668
                                                        385/12
(Continued)

FOREIGN PATENT DOCUMENTS

DE    10012926    10/2001
EP    2199755     6/2010
(Continued)

OTHER PUBLICATIONS

International Search Report for International Application No. PCT/GB2018/052486, dated Nov. 7, 2018, European Patent Office.
(Continued)

*Primary Examiner* — Nathaniel T Woodward
(74) *Attorney, Agent, or Firm* — Womble Bond Dickinson (US) LLP

(57) ABSTRACT

A method of assessing fluid flow in a conduit, the fluid comprising hydrocarbons, the method comprising the steps of: (a) measuring optical variances resulting from at least one circumferential mode of vibration of the conduit by directing a monochromatic light source, such as from a vibrometer, onto an external surface of the conduit thereby providing a measured vibration of the conduit as a result of fluid flow in the conduit. The data normally accurately measures velocity of the conduit usually considered to be wideband noise. Accordingly, sample rates are high, such as at least 5,000 times per second. The data is then assessed, for example by using a Fourier Transform, and a pre-trained algorithm to predict fluid flow at that point in the conduit, or upstream or downstream thereof. An associated apparatus is also disclosed. Embodiments of the invention can thus provide a non-invasive method and apparatus for providing information on the nature of flow regimes in pipelines, such (Continued)

as subsea pipelines which can be useful to optimise production and reduce well testing and/or downtime.

24 Claims, 11 Drawing Sheets

(58) Field of Classification Search
USPC ...................................................... 73/861.18
See application file for complete search history.

(56) References Cited

U.S. PATENT DOCUMENTS

| | | | |
|---|---|---|---|
| 2003/0089180 | A1 | 5/2003 | Amabili et al. |
| 2005/0012935 | A1* | 1/2005 | Kersey .................. G01H 9/002 356/519 |
| 2005/0120799 | A1 | 6/2005 | Gysling et al. |
| 2015/0377667 | A1* | 12/2015 | Ahmad .................. G01N 29/14 702/48 |
| 2016/0369623 | A1 | 12/2016 | Ahmad et al. |

FOREIGN PATENT DOCUMENTS

| | | |
|---|---|---|
| JP | H09196716 | 7/1997 |
| JP | H1082700 | 3/1998 |
| WO | WO 2009/062162 | 5/2009 |

OTHER PUBLICATIONS

Written Opinion for International Application No. PCT/GB2018/052486, dated Nov. 7, 2018, European Patent Office.
Search report for corresponding GB application 1714069.0 dated Dec. 29, 2017.
Combined search and examination report for corresponding GB application 1814303.2 dated Mar. 5, 2019.
Examination report for corresponding GB application 1814303.2 dated May 11, 2020.
UKIPO Report of telephone conversation regarding GB1814303.2, May 21, 2020.
UKIPO Examination Report for Application No. GB1814303.2, dated Mar. 3, 2021.

* cited by examiner

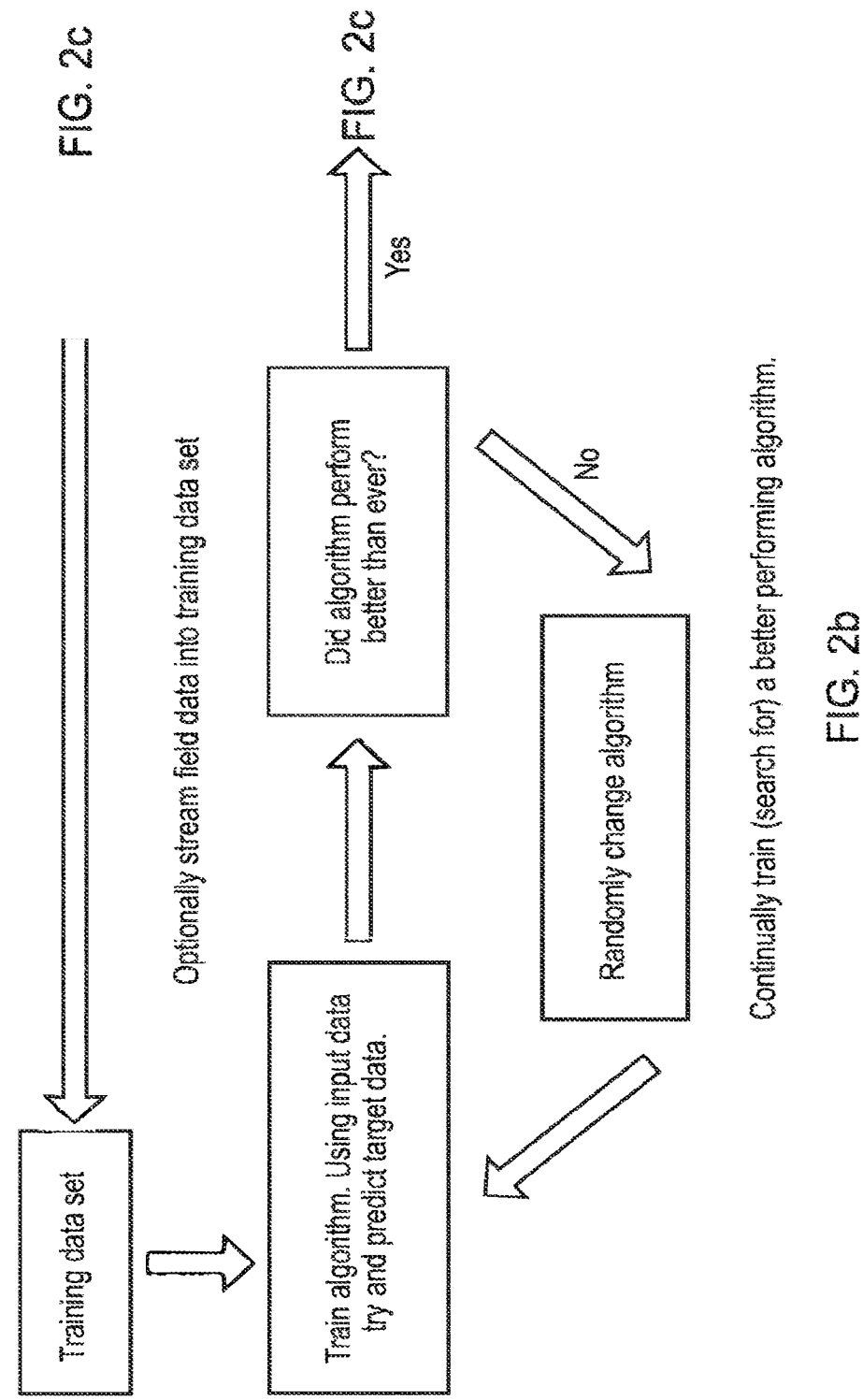

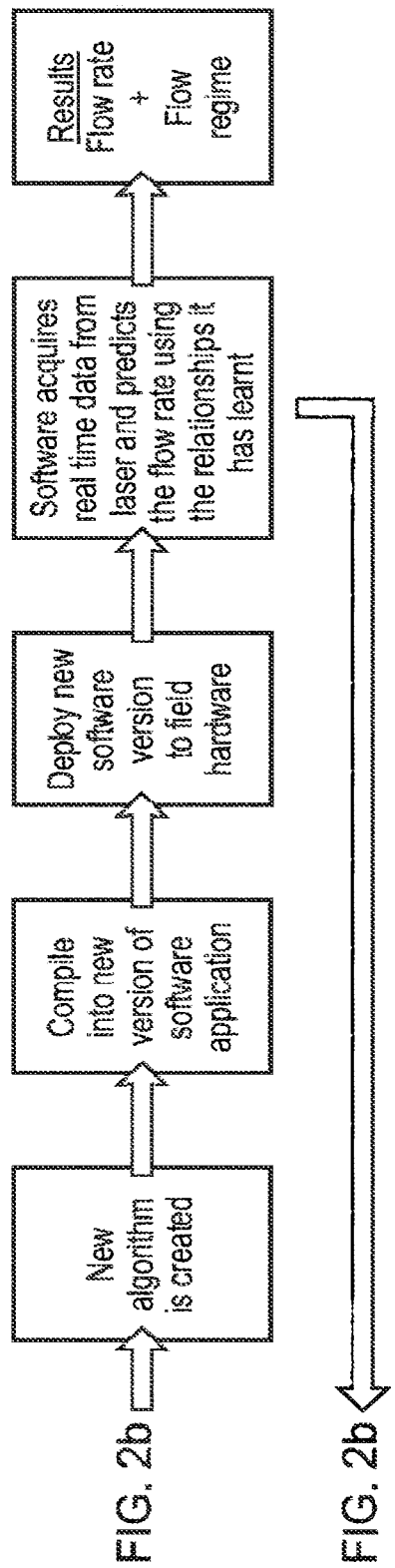

FIG. 6

METHOD AND APPARATUS FOR ASSESSING FLUID FLOW

CROSS REFERENCE TO RELATED APPLICATIONS

This application is a 35 U.S.C. 371 National Stage of International Application No. PCT/GB2018/052486, titled "METHOD AND APPARATUS FOR ASSESSING FLUID FLOW", filed Sep. 3, 2018, which claims priority to GB Application No. 1714069.0, titled "APPARATUS AND METHOD", filed Sep. 1, 2017, all of which are incorporated by reference herein in their entirety.

The present invention relates to a method and associated apparatus for assessing fluid flow in a conduit especially for use in the oil and gas industry.

Oil and gas production wells often flow a mixture of different fluids including oil, gas, condensate and water. The composition of the fluids will often change over the life of a well and in many instances the composition can be rather noisy and fluctuate on a daily basis. The various components of the fluid are normally separated and then transported to their own dedicated processing plant/equipment.

It is now increasingly common to look for and exploit smaller fields. These smaller fields may contain 30 million barrels instead of 3 billion. Individually these smaller fields cannot support all of the infrastructure that a bigger field can support, so they are developed by tying them back to the existing infrastructure of the older bigger fields.

Subsea tie backs are normally a group of wells on the seabed flowing into a manifold and a pipeline flowing from the manifold back to the platform. Flow from each well is normally noisy and can be volatile. This is because the reservoir is a heterogeneous rock having a variable and often unpredictable composition.

Wells typically flow a mixture of oil, gas, water and even sand. An operator will typically want the oil out first and to leave behind as much gas, water and sand as possible. But it is only possible to know what a well is producing once the fluids arrive at the topside facility and this could take 20 minutes or more. By this point all of the well streams have commingled at the manifold and it is not possible to know what fraction came from what well.

In multiphase fluids (fluids consisting of two or more immiscible liquids and/or gases) there are many complex flow regimes that may develop depending on the fluid thermophysical properties, the properties of state and the mass flow rates of the individual fluid components If the topside suddenly starts to receive a lot of gas, then it is often difficult to determine which well it is coming from. The operator has to sequentially choke back each well and wait to see the results. By the time the resulting changes flow back to the topside, the gas mixture might have changed again. Oil fields are therefore typically operated on statistical time-variant models. The lag-time in the feedback loop is too much to operate these subsea wells as effectively as surface wells and this is the main reason that subsea wells only produce 75% as much oil as surface wells.

Previous options to consider fluid flow in a conduit include various techniques. Some are invasive, and compromise the veracity of the recovered data, and may be difficult to introduce into the conduit, for example requiring suspension of fluid flow.

Another option to monitor flow rate is to track a pressure disturbance in a conduit. For example, an eddy pressure disturbance in the fluid may be tracked by assessing the pressure drop at spaced apart locations along the conduit. For example, if the Eddy disturbance is 5 cm in length and fluid is flowing at 200 cm/s then the pressure drop caused by the Eddy will be measurable for 1/40th of a second (whilst it passes the sensor). Therefore, a sample rate of 100 samples per second is sufficient to record pipe deflection caused by an Eddy passing and relating this to the same Eddy passing another observation point further downstream. A flow rate of e.g. 10% faster would benefit from a commensurate increase in the sample rate.

US2005/0012935, the disclosure of which is incorporated herein by reference in its entirety, discloses an optical measurement device to track unsteady pressures within the fluid at two or more axial locations along the pipe.

Embodiments of the invention aim to provide more convenient information on the nature of flow in a conduit. Embodiments of the present invention aim to provide a way of seeing what each individual well of a group of wells is producing before the flow is mixed with the flow from another well. Embodiments of the present invention aims to provide a way to monitor fluids produced from a well in real time. That way an operator would know when any particular well was producing a lot of gas for example and a choke setting could be adjusted.

In accordance with a first aspect of the present invention there is provided a method of assessing fluid flow in a conduit, the method comprising the steps of:
measuring vibration of the conduit using a device for measuring vibration; and
assessing the fluid flow in the conduit using the measured vibration of the conduit;
wherein the measured vibration of the conduit is a result of the fluid flow in the conduit and normally based on at least one circumferential mode of vibration.

In accordance with a second aspect of the present invention there is provided an apparatus for assessing fluid flow in a conduit, the apparatus comprising a device for measuring vibration of the conduit normally based on at least one circumferential mode of vibration, wherein the measured vibration of the conduit is a result of and indicative of the fluid flow in the conduit.

The present invention therefore normally considers the circumferential or ring vibrations/frequencies in contradistinction to US2005/0012935 where this would be considered as noise.

This normally requires a much higher sampling rate than anything considered for Eddy tracking, such as at least 5,000 samples per second, more than 10,000 samples per second or even perhaps more than 100,000 samples per second.

The sample rate for the present invention is not particularly associated with the flow rate, but is connected to the speed of sound in the conduit and the diameter thereof. Smaller pipe diameters require higher sample rates.

The sample rate is preferably twice the highest frequency of interest. For example, if a frequency of 100,000 Hz is of interest, then the sample rate is preferably at least 200,000 samples per second.

Also in contradistinction to US2005/0012935, this assessment can also be performed from a single point measurement, rather than requiring multiple sensors tracking a pressure wave. Accordingly, the ring or circumferential modes of vibration or frequencies are observed normally at a single location, and therefore the data received is normally vectorless.

In use the flow of fluid through the conduit causes the conduit to vibrate. This may be referred to as flow induced vibration. There are commonly two types of flow induced vibration. The first type of vibration is high amplitude structural vibration. This is typically caused by axial modes of vibration along the longitudinal axis of the conduit, also referred to as internal modes of vibration, and may for example be reciprocating n/s shaped axial bending.

The second type of vibration is low amplitude membrane vibration. This is typically invisible to the naked eye. This is typically caused by ring modes of vibration. The ring modes of vibration may be referred to as circumferential modes of vibration. The ring modes of vibration are typically smaller in amplitude and higher in frequency compared to the axial modes of vibration.

Relatively positive and negative pressure fluctuations in the conduit reflect the modes of membrane vibration as shown in FIG. 6 below.

Ring or circumferential modes of vibration are normally described as shown in FIG. 7 below.

The ring or circumferential modes of vibration shown in FIG. 7 may also be illustrated as shown in FIG. 8 below.

Each mode of vibration can be described as oscillation about an axis of symmetry.

The flow induced vibration that causes the conduit to vibrate and therefore the vibration of the conduit measured using the device for measuring vibration according to the present invention is typically one or more circumferential modes of vibration.

As the wideband noise, with its chaotic source enters the body of the pipe, the pipe responds by becoming harmonically excited across a wideband frequency range. However this excitation is very quickly attenuated/damped across the full frequency range leaving only the harmonic modes which are the ring frequencies.

It is considered that the ring frequency is the frequency where 1 wave length=1 circumference, at the speed of sound. In the ring frequency condition the pipe resonates with a single waveform of deflection rolling around the circumference of a circumferential cross section. The second ring frequency mode is where 2× wavelengths (of sound)=1 circumference. In mode 2 the pipe resonates with two adjacent waveforms that each equal ½ the circumference. In mode 3 the pipe resonates with three adjacent waveforms that each equal ⅓ the circumference (the cross section looks triangular in deflection) and so on.

Preferably at least, 5, 15, or 30 modes of vibration may be observed on how they behave under known fluid flow conditions (stable and unstable).

The samples from these ring modes and the known flow conditions are used to train an algorithm so that it can predict the flow conditions from the ring frequencies, indeed it may predict them from the ring frequencies alone.

The fluid flow in the conduit has kinetic energy normally at least in part due to turbulent fluid flow in the conduit. This turbulent kinetic energy normally generates a passive signal, which can be characterised as wideband noise, which elicits a surface velocity response in the conduit that is conveying the turbulent fluid. As the fluid flows through the conduit, some of the kinetic energy is normally transferred from the fluid to the conduit for example in the form of drag which pulls on an inner surface and/or wall of the conduit. This turbulent fluid flow normally causes the conduit to vibrate. It is typically this vibration that is measured. The kinetic energy of the fluid may be referred to as a source of wideband chaotic noise.

The flow of fluid in the conduit is typically turbulent and/or has a turbulent boundary layer. The flow of fluid is typically heterogeneous, that is the local pressure and absolute velocity of the fluid in the conduit is heterogeneous.

The velocity or absolute velocity of the fluid in the conduit is normally zero at an inner surface and/or wall of the conduit, typically because of the no-slip condition. The velocity or absolute velocity of the fluid towards a centre of the conduit is typically relatively high and/or at a maximum.

The flow of fluid between the wall and centre of the conduit is typically chaotic due to dynamic fluid shear effects. A portion of the flow of fluid between the wall and centre of the conduit may be referred to as a turbulent boundary layer and/or velocity boundary layer.

The flow induced vibration that causes the conduit to vibrate and therefore the vibration of the conduit measured using the device for measuring vibration according to the present invention is typically one or more circumferential modes of vibration.

The device for measuring vibration of the conduit may be able to detect one or more of the turbulent boundary layer, turbulent fluid flow and partially or fully developed turbulent fluid flow.

Thus, the measured vibration of the conduit is typically a direct result of and indicative of the fluid flow in the conduit. The measured vibration of the conduit is typically a direct result of the fluid flow in the conduit when the fluid itself is the source of vibration, not for example, vibration that is the result of an input from outside the conduit, typically an electromagnetic signal outside the conduit.

The mono-chromatic light source and receiver for reflections may be a laser and may be a device for measuring vibration such as a vibrometer or may be an interferometer using the interferometry method. The device for measuring vibration is normally a Laser Doppler vibrometer. which detects optical variances, also known as a Doppler Shift, and so measures the vibrational velocity of an external surface of the conduit. The external surface of the conduit typically moves due to wideband noise generated by turbulent fluid flow in the conduit.

The device for measuring vibration may be contained in a housing. The housing may be a pressure vessel. The pressure vessel typically separates and/or isolates the device for measuring vibration from the surrounding environment. The surrounding environment may be at a higher pressure compared to the pressure inside the housing. The housing may have a window for an output from and/or input into the device for measuring vibration when for example, the conduit is a subsea pipeline.

The fluid flow in the conduit typically has a Reynolds number of equal to or greater than 2,000.

The device for measuring vibration is typically able to measure the velocity of an external surface of the conduit to an accuracy of +/−20 nm/s.

The apparatus may be used to one or more of assess or estimate, evaluate and determine fluid flow in the conduit, fluid flow conditions in the conduit. The fluid flow conditions including one or more of the kinetic energy, velocity, density and composition of the fluid in the conduit. Flow regime and flow rate are of particular interest. The fluid flow regime and/or physical characteristics of the fluid such as may include: wavy flow, stratified flow, annular flow, misty flow and bubble flow and others.

It may be an advantage of the present invention that the apparatus for assessing fluid flow has no or little impact on fluid flow in the conduit. This is because the apparatus according to the present invention is non-invasive, that is it is not in contact with the fluid in the conduit.

It may be an advantage of the present invention that the apparatus for assessing fluid flow can be one or more of fitted, removed and serviced without interrupting the flow of fluid in the conduit.

The conduit is typically a pipe. The pipe is typically a hollow cylinder and/or has a circular cross-section. The pipe may be a cylindrical membrane that encapsulates the flow fluid and separates the conveyed flow of fluid from ambient fluid(s).

The fluid may be gas or liquid or a combination of a gas and liquid. The gas may be natural gas. The liquid may be oil, normally crude oil and may contain varying amounts of water. The fluid may comprise hydrocarbons in more than one of the solid, liquid and gas physical phases. There may be a solid in the conduit. The solid may for example be wax and/or sand.

The fluid typically comprises hydrocarbons. The hydrocarbons are normally in one or more physical phases, including gas, liquid and solid. The pipe may be subsea. The conduit is typically a subsea pipeline carrying hydrocarbon fluids.

Certain known apparatus and methods for estimating the fluid flow in a conduit usually use a source of electromagnetic radiation to excite and/or cause kinetic energy in the fluid in the conduit. This kinetic energy can cause the conduit to vibrate and it is this vibration that is measured. In contrast, the apparatus and method of the present invention rely on and measure the vibration of the conduit caused by the turbulent fluid flow in the conduit. The known apparatus and methods for estimating the fluid flow in a conduit may be referred to as active systems. The apparatus and method of the present invention may be referred to as passive systems.

It may be an advantage of the present invention that a passive system provides a truer and/or more accurate assessment of the fluid flow in the conduit. An active system relies on input electromagnetic radiation to excite and/or cause kinetic energy in the fluid and so the information obtained is often distorted and/or influenced by the input electromagnetic radiation. A source of the input electromagnetic radiation may be an ultrasonic transducer and/or an acoustic chirp. The electromagnetic radiation may comprise microwave radiation. The electromagnetic radiation may comprise acoustic waves. The acoustic waves may be longitudinal and/or transverse waves.

Embodiments of the invention may further include the step of processing the signal/passive signal or signatures using a Fast Fourier Transform (FFT), Direct Fourier Transform (DFT), or other means of representing the signal in the Frequency Domain. The passive signal/signal is typically post processed using a Fast Fourier Transform (FFT) and expressed in the frequency domain. The processing of the signal into the frequency domain may occur at a rate of more than once per second, optionally more than five thousand times per second or more than ten thousand times per second.

Thus, as the ring frequencies are normally those observed here, these tend to be in the frequency range of above 5000 Hz, usually above 10,000 Hz. Thus frequencies above these levels may be used to assess fluid flow through the conduit and maybe used as input data for an algorithm.

The step of assessing the fluid flow in the conduit using the measured vibration of the conduit normally includes producing a graphical and/or tabular output. The graphical output is typically a series of spikes of the amplitude frequency occurring at natural frequencies which represent the modes of ring vibration, as illustrated in FIG. 7 and FIG. 8 in particular the first 32 modes of ring frequencies may be observed. The height of the spikes typically indicates the velocity of the fluid and/or fluid mixture although not necessary all and not necessarily in a uniform way. The position of the spikes on the x-axis typically indicates the fluid density. The shape and/or skew of the spikes typically indicate the composition and/or compressibility of the fluid and/or fluid mixture. When the compressibility of the liquid changes, it is considered that higher mode ring frequencies (e.g. modes 10-32) suffer attenuation (softened and reduced) of varying degrees (although not uniform or linear).

When empty, the conduit typically resonates at natural harmonic frequencies when excited. When there is fluid in the conduit, the natural frequencies will change as the mass of the excited system has changed.

As the kinetic energy travels through the fluid this wideband noise it is subject to other physical mechanisms such as attenuation as resonance, both of which vary with different fluid properties. This has the effect of changing the frequency profile of the wideband noise as the noise passes through the fluid.

As the 'fluid attenuated' wideband noise passes from the fluid into the pipe a transfer of kinetic energy from the fluid to the pipe takes places. As such the pipe wall itself becomes excited by this continual source of kinetic energy and as a rigid body it begins to exhibit a harmonic response, dissipating the kinetic energy it gains as noise and heat.

A certain amount of kinetic energy enters a system with the flowing fluid and an amount of kinetic energy exits the system with the flowing fluid but a small amount of the kinetic energy exits the system via the pipe wall. This energy is usually considered as "losses" such as "friction losses" and can be represented as the change in pressure. The kinetic energy "leaking" from the flow is a deterministic result of flowing a given fluid through a given closed conduit. The leakage of this kinetic energy is considered repeatable outcome for any two identical systems.

In a 3D time variant FFT frequency domain, a frequency signature may appear as a series of trails at the resonant frequencies of the system which includes the conduit and the conveyed fluid.

In order to assess the fluid flow, embodiments of the invention may further include the step of applying one or more feature recognition techniques to a signal signature in order to characterise a potentially wide variety of known flow regimes. In the case of a multiphase hydrocarbon mixture, these flow regimes may have very complex dynamics. Furthermore, the different components of the hydrocarbon mixture may undergo continual phase changes, leading to changes in the corresponding flow regimes. The flow regimes may include one or more of slugging, annular flow, elongated bubble flow, dispersed bubble flow and travelling sand clumps.

Once the flow regime has been characterised, it is typically then possible to manually or automatically select an algorithm specific to that flow regime in order to apply one or more algorithmic metering methods for flow rate or other flow characteristics, such as quantifying the size and frequency of sand clumps, the velocity and volume of elongated bubbles and the size and frequency of slugs.

An algorithm is normally trained to map relationships between known flow data and the signal signatures, and then used to apply this mapped relationship to assess the nature of unknown fluid flow characteristics in use, based on the signal signatures. Training of the algorithm may include using further data, including at least one of: pipeline diameter, pipeline thickness, pipeline material, fluid chemistry, temperature, pressure and surface tension.

In use, the algorithm can continue to be optimised by learning predictions against flow information gained from other sources.

During the algorithm learning step, the known flow data may be referred to as target data. Target data may comprise a plurality of fluid flow regimes and flow rates, and/or other flow characteristics.

The algorithm can learn to classify the different flow regimes based on the input data and comparing it to known flow regimes which are observed. The flow regimes may comprise one or more of plugging, slugging, bubble flow, annular flow, mist, wavy flow and stratified flow.

The one or more feature recognition techniques may comprise a step of classifying the input data. The step of classifying the input data typically involves using at least two of the plurality of fluid flow regimes. The at least two of the plurality of fluid flow regimes may represent classes for the purpose of classification of the input data. In an example classification a certain combination of frequency and amplitude values may correspond to a specific flow regime, while a different combination of frequency and amplitude may not correspond to the same flow regime.

The step of classifying the input data may involve one or more classification methods including logistic regression, support vector machines, naïve Bayes classifiers, random decision forests.

The step of classifying the input data may comprise calculating one or more statistical measures in order to quantify one or more parameters of the flow regimes. The one or more parameters of the flow regimes may comprise periodicity thereof. The one or more parameters of the flow regimes may comprise kinetic energy, attenuation, compressibility, density and/or viscosity of the fluid. Examples of the one or more statistical measures include time average, variance, standard deviation, moving average convergence and moving average divergence.

The step classifying the input data may comprise building a classification tree. The classification tree may be used for classifying the input data using the one or more classification methods. The classification tree may comprise a plurality of branches. There may be a branch of the classification tree assigned to each fluid flow regime. The classification tree may be used to select a suitable algorithm for measuring the mass flow rates at a particular flow regime.

The step of classifying the input data may involve creating a flow map, for example a diagram of parameters characterising superficial gas versus superficial liquid.

The one or more feature recognition techniques typically further comprises a step of assessing or predicting a target value. The target value may be a continuous quantity. The step of predicting a target value may comprise one or more methods for predicting a continuous quantity. Examples of said methods include regression methods and linear transformation.

The one or more methods for predicting a continuous quantity may be used at one or more of the plurality of branches of the classification tree, typically at each of said branches. The one or more methods for predicting a continuous quantity may be used to predict the mass flow rates of the fluid phases from the input data.

The continuous quantity may be the mass flow rate. Optionally, for each fluid flow regime there may be an algorithm for predicting the associated mass flow rate from the corresponding input data. The corresponding input data is normally the input data labelled with that flow regime during the step of classification thereof.

The step of classifying the input data and/or the step of predicting a target value contribute to a step of algorithm training. The step of algorithm training may be repeated numerous times. Repeating the step of algorithm training may randomly or incrementally improve the predictive ability of the algorithm as it compares its target data result to the data provided during training, and assesses the error, then repeats until it determines a smaller error and smaller error.

The input data and target data may be collectively referred to as training data. A training data set may comprise one or more input data sets and one or more target data sets.

The one or more feature recognition techniques may involve a step of acquiring data, typically real-time data, from a field apparatus/deployed system.

The one or more feature recognition techniques may further involve a step of predicting and/or assessing fluid flow in at least one conduit. The step of predicting or assessing the fluid flow in the conduit may involve determining one or more characteristics of the fluid flow, said one or more characteristics typically comprising fluid flow regime and/or mass flow rate. The said one or more characteristics may be referred to as results.

The one or more feature recognition techniques may further comprise a step of inputting the results back into the one or more training data sets. The step of inputting the results back into the one or more training data sets may increase the size and accuracy of the one or more training data sets. The step of inputting the results back into one or more training data sets may be repeated a number of times, typically many times, and optionally throughout the duration of the process of assessing fluid flow in the conduit.

The steps of data collection, classification of input data, prediction of outputs and fluid flow assessment, typically run in parallel and in real time on the deployed. Thus, the deployed system may be constantly, periodically or frequently updating the data sets, reclassifying and predicting outputs, thereby constantly, periodically or frequently improving the algorithms' predictive ability.

A neural network may be used in order to train and use the algorithm. This may comprise a plurality of nodes, connected by 'neurons' in a plurality of layers. Input, normally the ring vibrational frequencies and amplitudes detected are added, and the output is the target data as described herein—flow rate and flow regime in particular—is determined.

Thus, the neural network can be used to map relationships between known target data and the signal signatures, the neural network comprising an input leading to a plurality of nodes in a first layer, which are normally connected in turn to a plurality of nodes in at least one second layer, each node comprising a weighting value and an offset value.

The input is normally weighted and/or offset at each node before being passed onto next layer. The amount of weighting and/or offset is usually different for each step. The initial amount of weighting and/or offset may be set randomly.

Normally, during the learning stage, the output is compared with a corresponding target value selected from the target data. The target value may be referred to as the desired result. Typically, the difference between the output and the desired result is measured and used to quantify the error in the output. The size of the error may be indicative of the performance of the algorithm under testing. The process then repeats itself and continually attempts to minimise the error from the previous best combination of weightings and offset values.

The repeated learning steps, following the initial step, may be changed randomly and/or based on a feedback loop. The subsequent learning steps, following the initial step may be changed stochastically.

Eventually, the different nodes have a suitable values to provide an accurate prediction for the target data. The amount of weighting and/or offset applied to the input at the different nodes, and the different number of layers, that result in the best prediction of the output is typically selected for use, so that the algorithm can then predict the flow based on the input i.e. normally the ring vibration frequencies.

By using the one or more feature recognition techniques, the method allows for a detailed surveillance of the complex flow regimes, offering an advantage over conventional meters that quantify the behaviour of the fluid in a given phase by means of a single variable, typically the flow rate. Characterising these flow regimes may be particularly important in the transportation of oil and gas. as it may, for example, help adjusting the operating regimes at a well site, and consequently allow for a better control of the well or a system of wells. The apparatus for and/or the method of assessing fluid flow in a conduit, may be applied to a plurality of conduits. Two of more of the plurality of conduits may lead to a combined location often through a manifold.

Where the apparatus and/or the method of the present invention are applied to a plurality of conduits, the fluid flow may be assessed in at least two of the plurality of conduits. The assessment of the fluid flow in the at least two of the plurality of conduits may be used to predict the fluid flow in the combined location or the manifold.

The monochromatic light source may be directed into a fibre optic, and travels through the fibre optic to a remote location before it is directed onto the external surface of the conduit. A multiplexer may be used which is adapted to switch and direct the light source in turn to the fibre optic, and at least one further fibre optic cable, each fibre optic cable leading to a different point on the conduit, and/or to different conduits, in order to direct the monochromatic light source onto the external face of the or a conduit. This can automatically switch quickly between different fibre optics to provide essentially continuous measurement across many different measurement points.

It may be an advantage of the present invention that the apparatus for assessing fluid flow in a conduit can be used to predict the fluid flow, typically the fluid flow conditions, before that fluid reaches the measurement point where the monochromatic light source is directed onto the conduit (upstream) or after passing this point (downstream). Indeed they may be used to predict behaviour in the well.

The inventor of the present invention has appreciated that a change in the measured vibration of the conduit can be indicative of fluid flow elsewhere. This may be particularly helpful if, for example, the upstream fluid would damage or inhibit equipment or processes downstream, giving an operator the chance to stop or change flow regimes to accommodate a change in fluid flow.

Features and optional features of the second aspect of the present invention may be incorporated into the first aspect of the present invention and vice versa.

An embodiment of the invention will now be described by way of example only and with reference to the accompanying drawings, in which:

FIGS. 2a, 2b and 2c are schematic representations of the method steps according to an embodiment of the present invention;

Figure 4A:
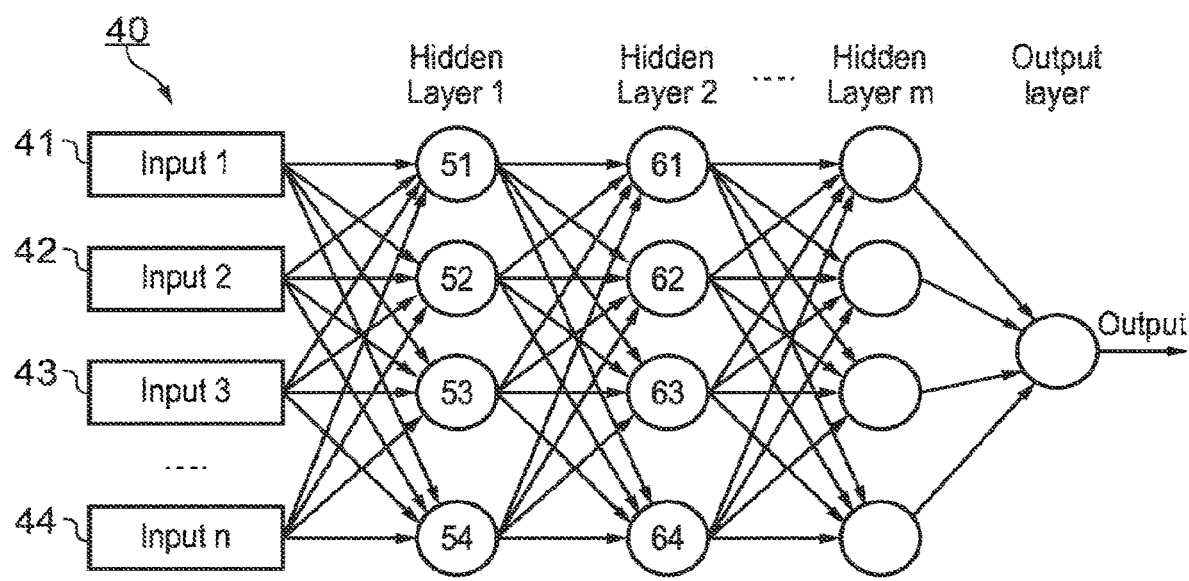
Figure 4B:
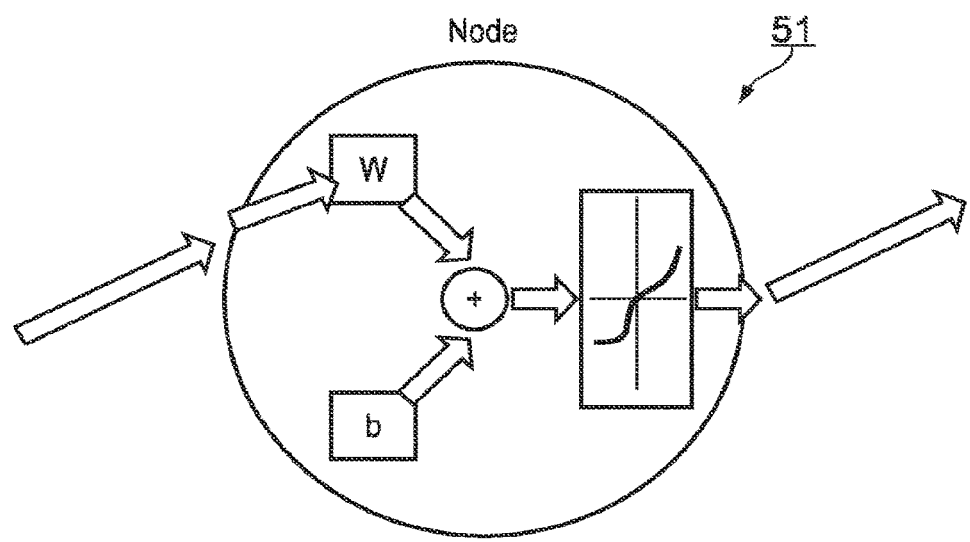
Figure 5:
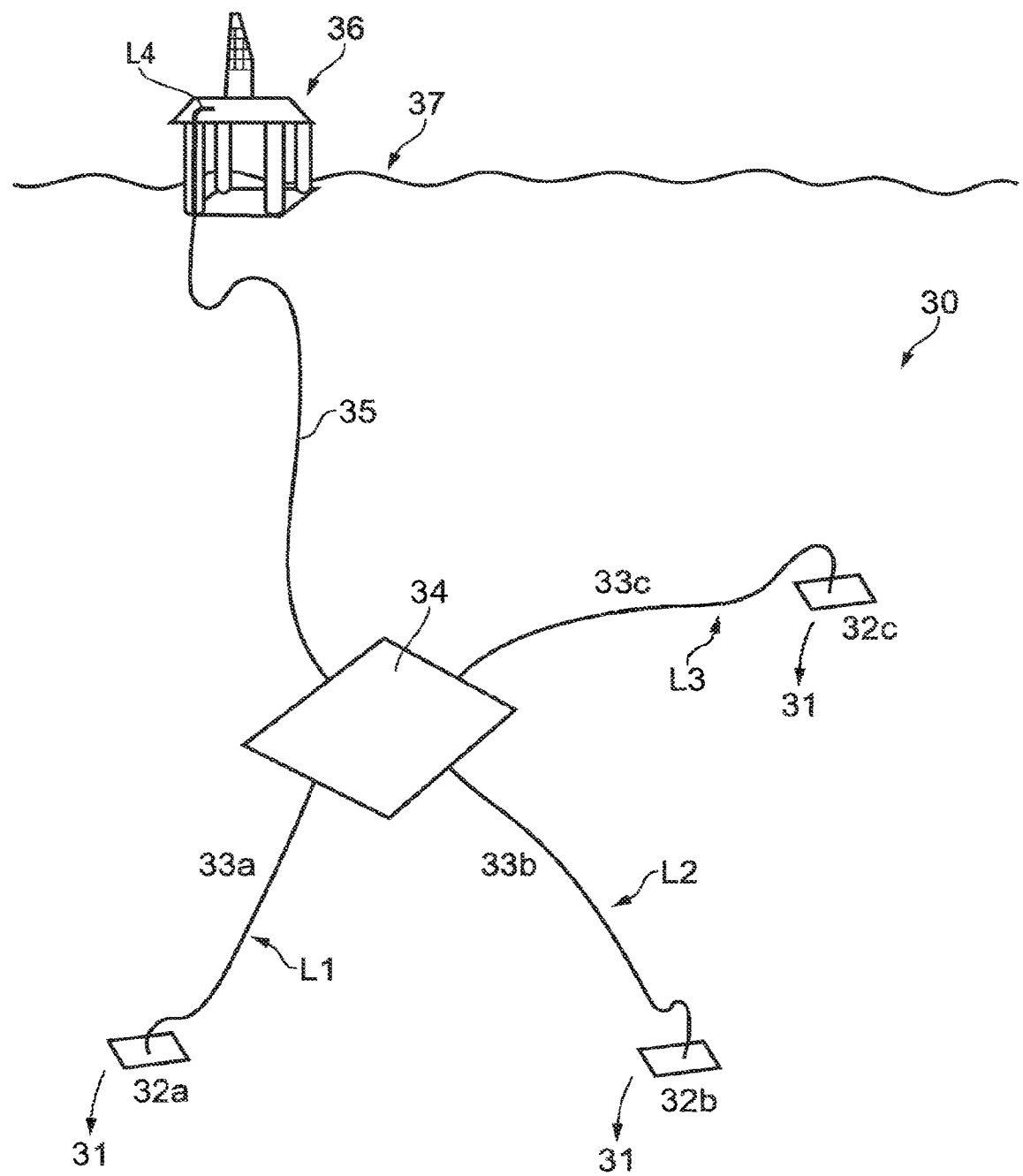
Figure 7:
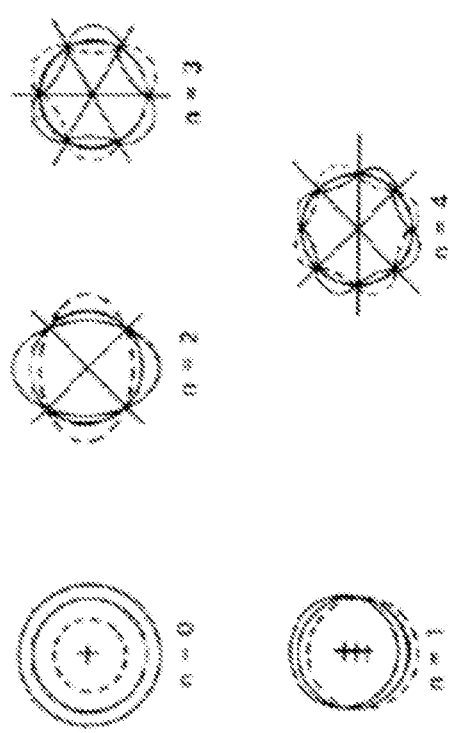

FIGS. 3a, 3b 3c and 3d are a series of graphs showing how the results of the step of assessing the fluid flow can be presented and how the graph changes with changes in the fluid flow;

FIGS. 4a and 4b are schematic representations of a neural network system used in an embodiment of the present invention;

FIG. 5 shows how embodiments of the present invention may be used in a subsea system;

Figure 6:
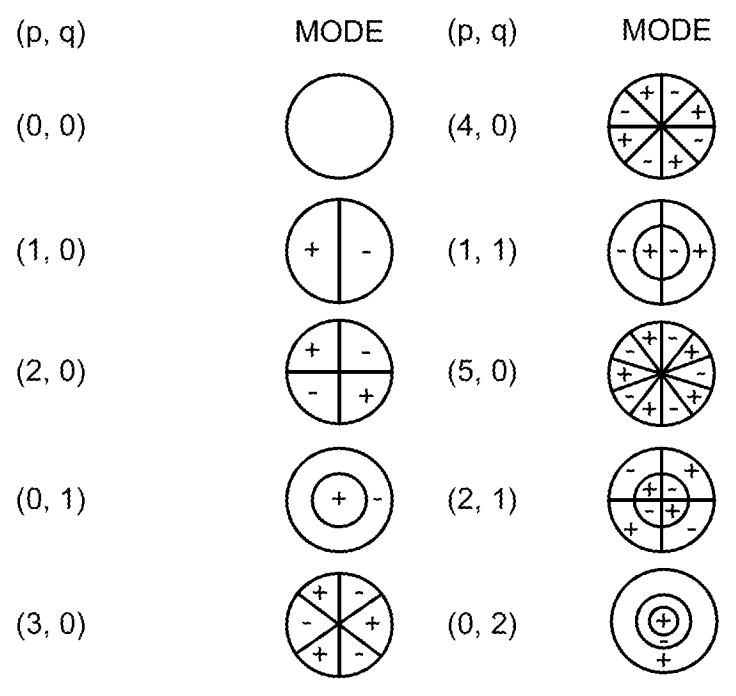

FIG. 6 shows the modes of membrane vibration reflected by relatively positive and negative pressure fluctuations in the conduit;

FIG. 7 shows ring or circumferential modes of vibration; and

Figure 8:
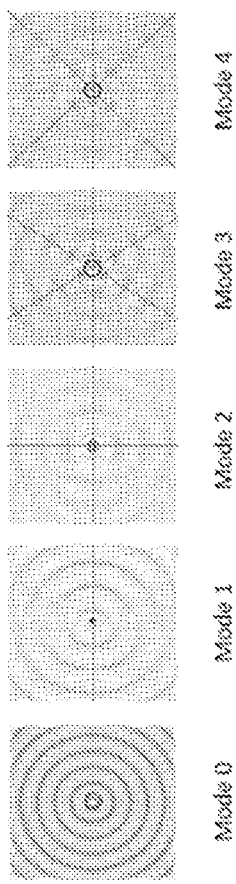

FIG. 8 shows another ring or circumferential modes of vibration.

Figure 1:
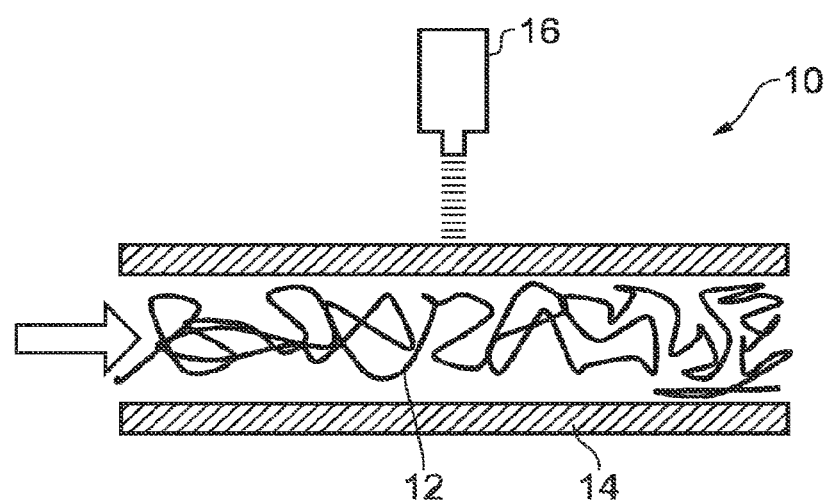
FIG. 1 is a schematic view of the apparatus according to an embodiment of the present invention.

FIG. 1 shows the apparatus 10 for assessing fluid flow 12 in a conduit 14. The apparatus 10 includes a device 16 for measuring vibration of the conduit 14. The device 16 for measuring vibration of the conduit 14 is a Laser Doppler vibrometer. The measured vibration of the conduit 14 is indicative of the fluid flow 12 in the conduit 14.

As one or more of the velocity, density and composition of the fluid flow in the conduit changes over time, the measured vibration of the conduit 14 also changes. A particular velocity, density and/or composition of the fluid flow in the conduit produces a unique vibrational response. This may be referred to as a signature vibration. Once a signature vibration has been identified and this has been correlated to a particular velocity, density and/or composition of fluid flow, the apparatus can be used to look for that signature vibration again and therefore identify when that particular velocity, density and/or composition of the fluid flow is present in the conduit.

The device can be trained to interpret various signature vibrations and identify corresponding fluid and flow parameters. This may be referred to as feature or pattern recognition. This may involve reference to an algorithm generated through 'machine learning'.

Figure 2A:
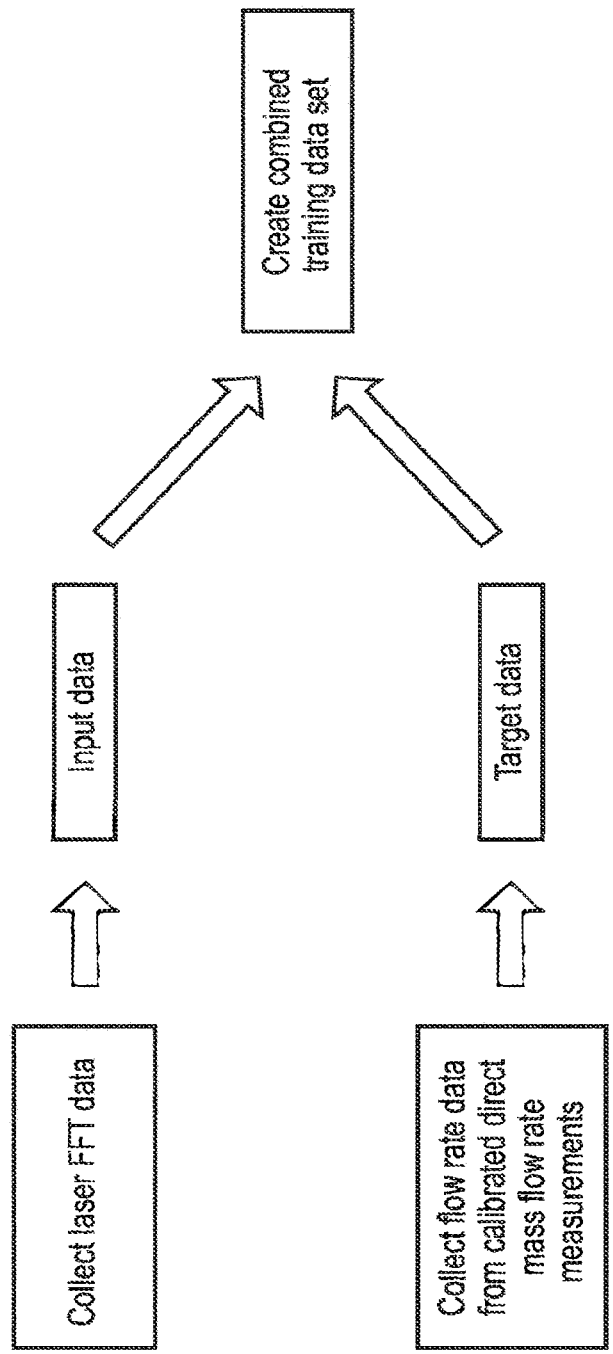

In order to generate the algorithm, laboratory simulations are undertaken, as shown in the flowchart in FIG. 2a. The flow rate, and the observed flow regime are entered into a computer, whilst data from the vibrometer, usually after FT processing, is generated for such flow rates and flow regimes. Other data may also be fed into the computer, such as one or more of the pipeline diameter, the pipeline thickens, pipeline material, the fluid chemistry, temperature, pressure and surface tension. These input data variables may be varied and repeated experiments may be done over a wide range of permutations. The resulting effects on the vibrometer data received are recorded. Exemplary vibrometer data could be:

| Time stamp (s) | Surface velocity (nm/s) |
| --- | --- |
| 0.003005 | 0.000035041 |
| 0.003006 | 0.000038821 |
| 0.003007 | 0.000040042 |
| 0.003008 | 0.000040037 |
| 0.003009 | 0.000041981 |
| 0.003010 | 0.000042086 |

By performing a Fourier Transform conversion on the data, it is converted into the frequency-amplitude domain where high amplitude frequencies would register at the 'ring frequencies' that represent the natural harmonics of the pipe where the greatest power density (rate of energy dissipation) occurred. An example of a frequency-converted graph is shown in FIG. 3a where the amplitude is on a logarithmic scale.

Figure 3A:
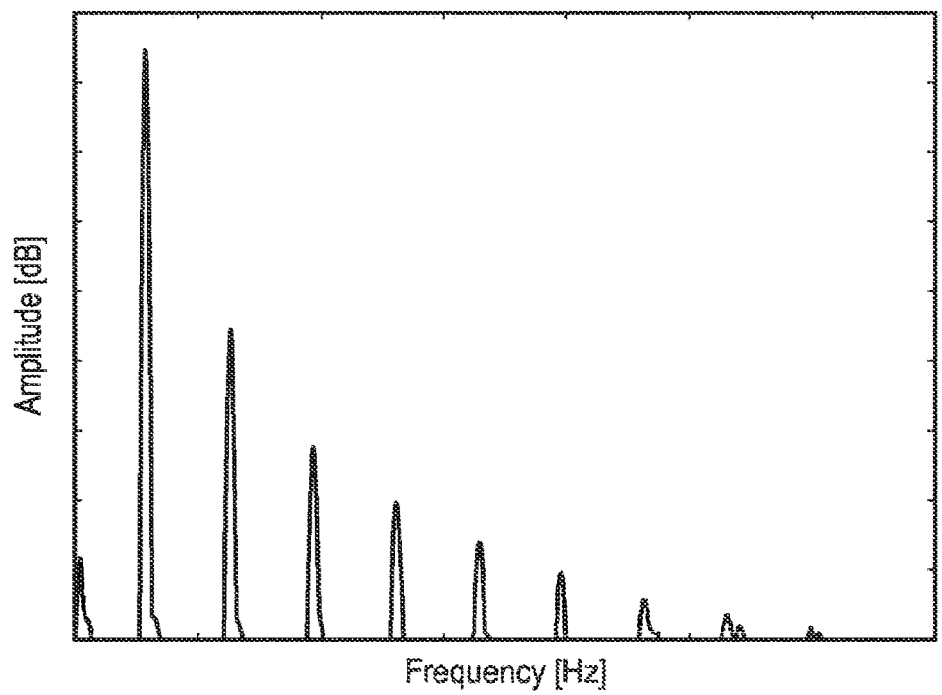

The most prominent spikes in the figure, such as FIG. 3a, are identified and the frequencies and amplitudes of the most important spikes are taken. These can be matched to the ring frequencies of the pipe.

Figure 3B:
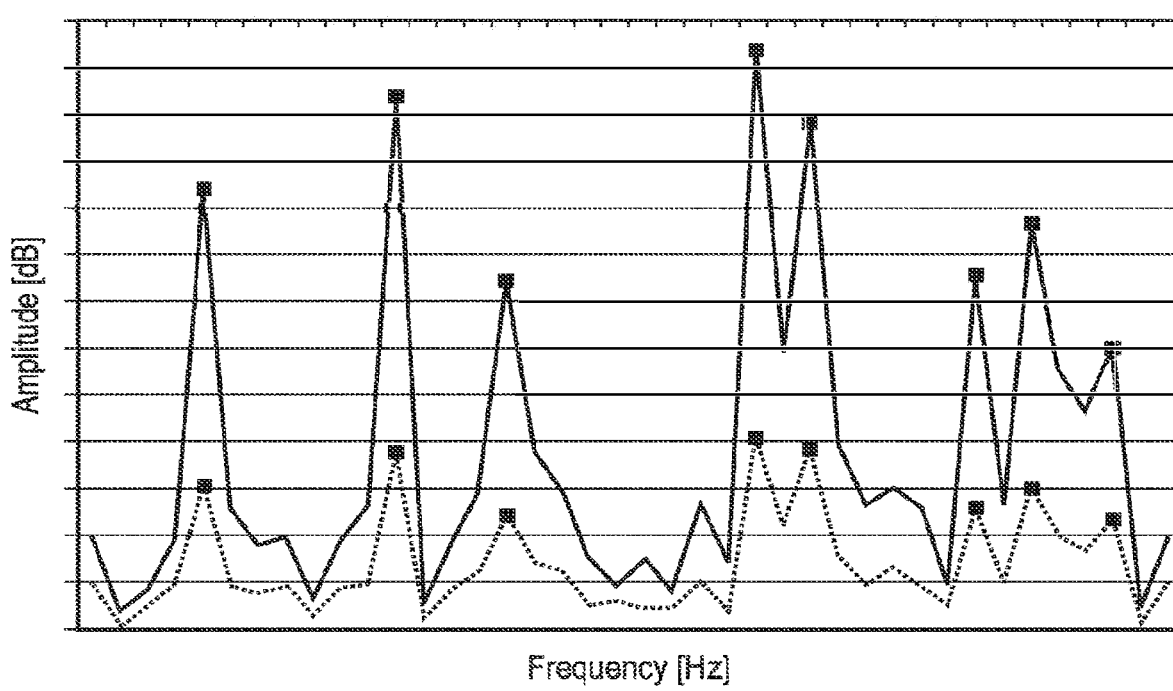
Figure 3C:
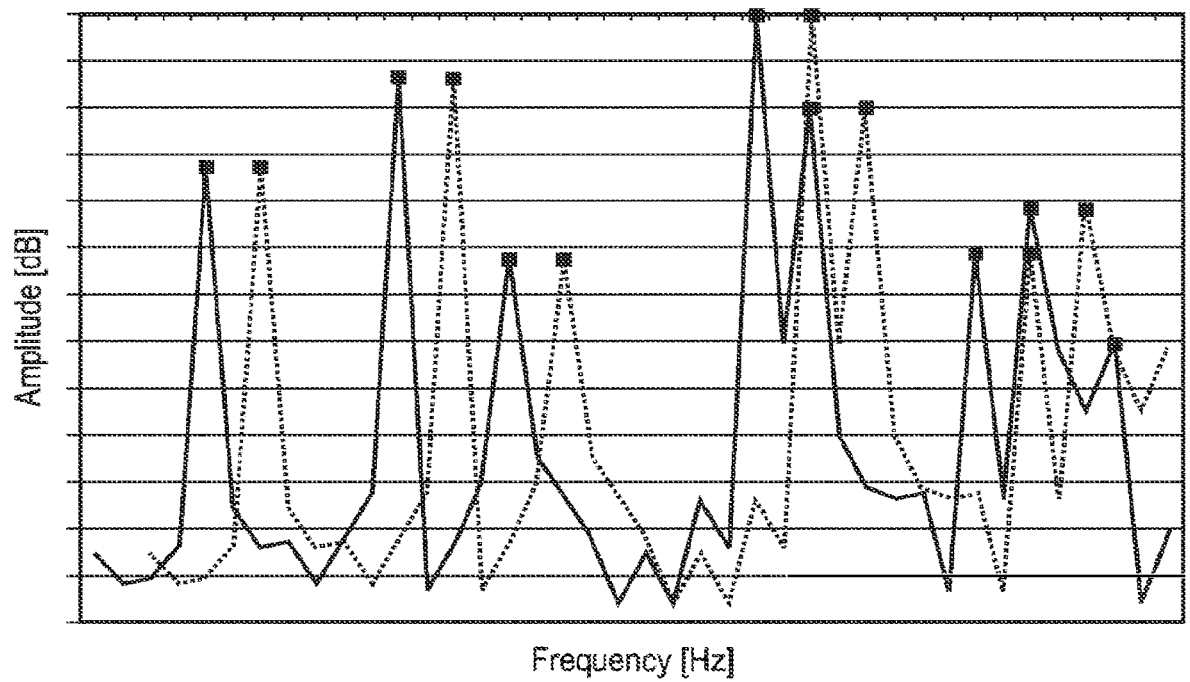
Figure 3D:
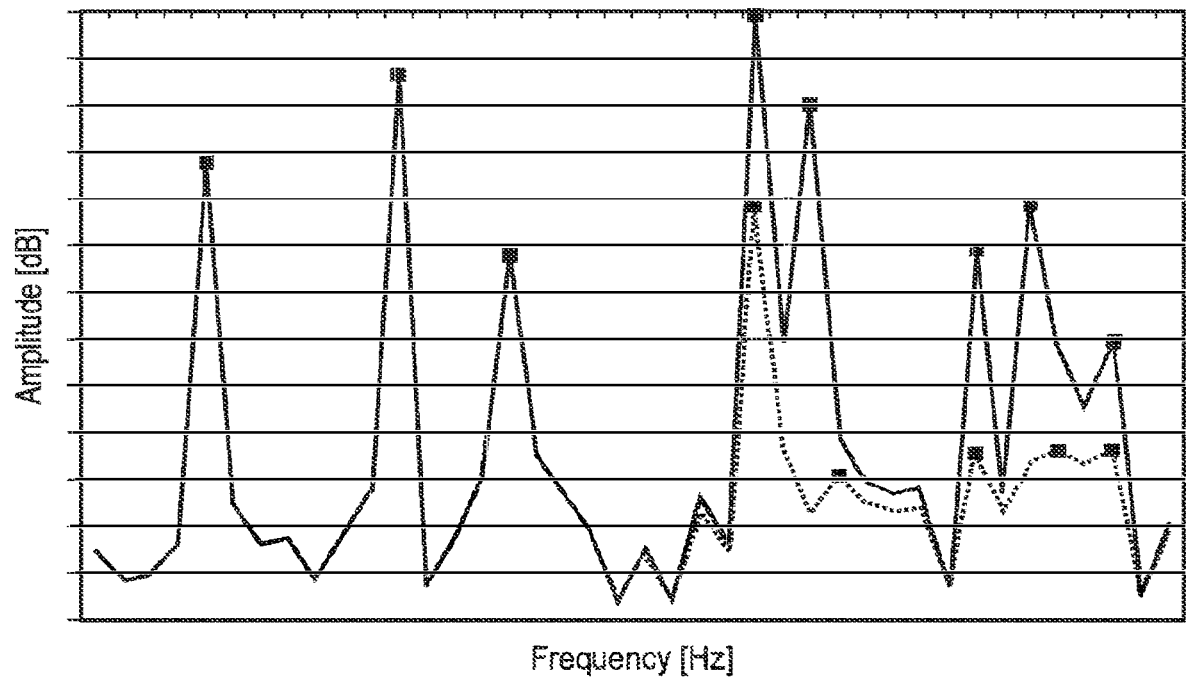

Ring frequency mode 1=2,900 Hz & $1.3\times10^{\wedge}-5$ dB
Ring frequency mode 2=5,802 Hz & $1.15\times10-5$ dB For certain embodiments, thirty two or more modes are considered. In other embodiments, over fifty may be considered. FIGS. 3b, 3c and 3d are further examples of graphs showing how the results of the step of assessing the fluid flow can be presented and how the graph changes with changes in fluid flow.

FIG. 3b shows how the amplitude of peaks is proportional to the velocity and/or kinetic energy of the fluid flow. FIG. 3c shows how frequency shift is proportional to the mass and/or density of the fluid flow. FIG. 3d shows how skew is proportional to attenuation and/or speed of sound and/or compressibility of the fluid flow.

A sample of this data is shown in table below:

| Frequency | Amplitude |
| --- | --- |
| 20,050 | 4.35012465 |
| 40,300 | 3.78954321 |
| 59,705 | 3.24567981 |
| 78,125 | 2.74536121 |
| 103,955 | 2.43489768 |
| 121,605 | 2.14867867 |

The data in this table is repeatable for a cross-sectional snapshot of the flow profile within the pipe.

There exists a complex deterministic relationship between the flow rate and other flow properties and the resulting vibrometer data, which is impractical to determine manually. Accordingly, machine learning routines are preferably used, as shown schematically in FIG. 2b.

The algorithm tries to predict the flow rate, based on a given start point, or even a random start point, and then compares this with the actual measured flow rate data. If this is an improved prediction compared to a previous prediction then algorithm adjusts the calculation accordingly. The optional learning loop is repeated numerous times, perhaps thousands of times. The algorithm may use randomly generated variants to the calculation, or some direction may be given by a controller or an optional learning loop. A combination of these may be used.

When the algorithm has been optimised by such numerous loops, and is therefore capable of accurately determining flow characteristics based on the vibrometer data, it is then ready for use in practise.

FIG. 2c shows such use. The new algorithm can therefore predict the flow rate and/or flow regime in practise.

For certain embodiments, events or data received by other means may be fed back into the algorithm so that it can continue to learn and optimise the flow rate or flow regime prediction.

For certain embodiments, different algorithms may be developed for different applications, such as different known flow regimes, in order to improve the predictability of the algorithms.

The step of algorithm training may involve utilising artificial neural networks. The artificial neural network typically comprises a plurality of layers illustrated in simplified form in FIG. 4a.

FIG. 4a receives a number of inputs, 41, 42, 43, 44 (though in practise it may be significantly more, such as fifty inputs) which are then fed onto nodes 51, 52, 53, 54. The inputs typically represent the data from the circumferential vibration modes, that have been converted to the frequency domain.

FIG. 4b is a schematic representation a node (although the example shows the node 51, the figure is representative of any node in the network). At each node 51, 52, 53, 54 the input is weighted "W" and offset "b", before it is passed to a node in the next layer of the network. Then at nodes 61, 62, 63, 63 it is weighted and offset again before it is passed to a node in the next layer, and so on. As indicated in FIG. 4a there may be many layers in the network and each layer may comprise many nodes.

The values of W and b are initially randomised at every node in the network (every node can have unique values for W and b) and the input training data is computed and compared to the target training data and then scored for accuracy. Then W and b are changed and the target computed and scored again. This process is repeated numerous times so the algorithm hones in on more and more accurate weightings and offset values to get closer to the correct result. The best performing W and b values are kept which forms the algorithm.

For certain embodiments, the learning can be directed and accelerated by stochastically changing W and b rather than randomly changing them.

There might be any number of neurons in each layer and any number of hidden layers and any number of nodes and any number of neurons.

FIG. 5 is a schematic representation of one application of embodiments of the present invention in a subsea system 30. The subsea system 30 comprises a plurality of conduits 33a, 33b, 33c, carrying fluid comprising hydrocarbons from a plurality of wells 32a, 32b, 32c on the seabed 31. The plurality of conduits 33a, 33b, 33c lead to a manifold 34. At the manifold 34 the fluid from the plurality of conduits 33a, 33b and 33c is mixed together and carried via a single conduit or pipeline/riser 35 to a surface facility 36.

Laser Doppler vibrometers comprising respective lasers L1, L2, L3, are located proximal to each conduit of the plurality of conduits 31a, 32b, 32c and are directed onto the external surface of the respective conduits 33a, 33b, 33c and used to measure the vibration of the external surface of the respective conduits 33a, 33b, 33c.

Accordingly, using the taught algorithm, as detailed above, information on the nature of the flow regime and flow rate in these wells may be obtained. If one well is producing an unfavourable mixture then it can be manually or automatically choked back. For example, if it is found that one well is producing too much water, or sand, it may be choked back. Without this information, it would not be possible to determine at the source facility which well was responsible for the increased water cut.

Other benefits may ensure, for example the surface facility separators (not shown) are normally limited in the rate of sand, gas or water they can cope with. Accordingly, the well is flowed at an appropriate rate for the separator to cope. For certain embodiments of the invention, where the nature of the produced fluids is much more predictable, the wells can be flowed at a higher rate under normal circumstances, and only adjusted when necessary and where the system indicates an unfavourable blend of produced fluids.

Depending on the field, further wells may be tied into the manifold and may also include flow rate and regime analysis as described herein.

A further Laser Doppler vibrometer L4 may be at the surface facility 36 at or near the surface. used additionally or instead of the lasers L1-L3. This can assess the nature of the flow rate and regime close to the separator. This information can be used in order to optimise operation of the separator even with a modest time period between assessed flow regime at L4 and the separator, such as 10 seconds.

For certain embodiments, the laser doppler vibrometer and associated electronics may be remotely positioned, for example on the surface facility, and the laser directed through a fibre optic to the respective conduits 33a-33c.

In some embodiments, the apparatus may comprise a device, such as a multiplexer, for selecting which of the plurality of conduits 33a, 33b, 33c are subjected to the measurement at a given time. For example, a single laser can be directed into the multiplexer which can direct it to multiple different locations, such as any of L1 to L4. It can further switch measurement consecutively around these different locations. For example, it may assess each location for less than a second before moving to the next location, and so on. This effectively provides continuous measurements at these different locations.

Data comprising the measured vibration is streamed to a computer usually on the surface facility 36 for real-time analysis using the taught algorithms as detailed above. The data may be used to assess fluid flow in at least one of the plurality of conduits 33a, 33b, 33c.

For certain embodiments, the algorithm can learn the nature of the flow regime upstream or downstream of the laser measuring point through the same learning process detailed above. (The combined flow regime is not as simple as the average of the constituent parts). Thus, the laser measurement at these points can be used to predict flow in the riser 35 or indeed the nature of the flow regime in the well.

For certain embodiments, other devices such as interferometers may be used instead of Laser Doppler vibrometer(s).

Modifications and improvements can be incorporated herein without departing from the scope of the invention.

The invention claimed is:

1. A method of assessing fluid flow in a conduit, the fluid comprising hydrocarbons, the method comprising the steps of:
   (a) measuring optical variances resulting from at least one circumferential mode of vibration of the conduit by directing a monochromatic light source onto an external surface of the conduit and detecting light to provide a measured vibration of the conduit as a result of fluid flow in the conduit; and
   (b) assessing the fluid flow in the conduit using the measured vibration of the conduit based on the at least one circumferential mode of vibration.

2. A method of assessing fluid flow according to claim 1, wherein the monochromatic light source and a receiver are provided as part of a Laser Doppler vibrometer or interferometer.

3. A method of assessing fluid flow according to claim 1, wherein the detector measures optical variances resulting from the vibrational velocity of an external surface of the conduit.

4. A method of assessing fluid flow according to claim 1, wherein optical variances from at least ten circumferential modes of vibration are measured.

5. A method of assessing fluid flow according to claim 1, wherein the optical variances are measured at least 5,000 times per second.

6. A method of assessing fluid flow according to claim 1, wherein the step of measuring optical variances from vibration of the conduit generates a series of signal signatures.

7. A method of assessing fluid flow as claimed in claim 6, wherein the method further comprises the step of expressing the signal signatures in the frequency domain such as by a Fourier Transform process.

8. A method of assessing fluid flow according to claim 7, wherein the step of assessing fluid flow in the conduit includes considering frequencies above 3,000 Hz, optionally above 10,000 Hz.

9. A method of assessing fluid flow as claimed in claim 6, wherein one or more feature recognition techniques is/are applied to the series of signal signatures in order to characterise a variety of flow regimes.

10. A method as claimed in claim 9, comprising training an algorithm to map relationships between known flow data and the signal signatures, then using the trained algorithm to assess the nature of the fluid flow based on the signal signatures.

11. A method as claimed in claim 10 comprising training the algorithm using further data, including at least one of: pipeline diameter, pipeline thickness, pipeline material, fluid chemistry, temperature, pressure and surface tension.

12. A method as claimed in claim 10, wherein a neural network is used to map relationships between known data and the signal signatures, the neural network comprising an input leading to a plurality of nodes in a first layer, which are connected in turn to a plurality of nodes in at least one second layer, each node comprising a weighting value and an offset value, each of which are optimised in order to produce an accurate prediction for the fluid flow.

13. A method of assessing fluid flow according to claim 1, wherein the conduit is a subsea pipeline.

14. A method of assessing fluid flow according to claim 1, wherein a change in the measured vibration of the conduit is indicative of the fluid flow in the conduit upstream or downstream of the external surface on which the monochromatic light source is directed.

15. A method for assessing fluid flow as claimed in claim 1, wherein the conduit is a first conduit and the fluid flows into a manifold and onwards into a downstream pipeline, and wherein at least one further conduit comprises fluid comprising hydrocarbons and flows into the manifold, and said downstream pipeline, such that the fluid from the first and at least one further conduit are combined in the downstream pipeline.

16. A method for assessing fluid flow according to claim 15, wherein the method further comprises a step of predicting the fluid flow in the downstream pipeline based on the assessment of fluid flow in at least the first conduit.

17. A method for assessing fluid flow according to claim 15, wherein step (a) is also applied to the at least one further conduit to assess fluid flow therein.

18. A method for assessing fluid flow as claimed in claim 17, wherein the method further comprises a step of predicting the fluid flow in the downstream pipeline based on the assessment of fluid flow in the first and the at least one further conduit.

19. A method for assessing fluid flow as claimed in claim 1, wherein the monochromatic light source is directed into a fibre optic, and travels through the fibre optic to a remote location before it is directed onto the external surface of the conduit.

20. A method for assessing fluid flow as claimed in claim 19, wherein the monochromatic light source is directed into a multiplexer, which is adapted to switch and direct the light source in turn to the fibre optic, and at least one further fibre optic cable, each fibre optic cable leading to a different point on the conduit, or different conduits, in order to direct the monochromatic light source onto the external face of the or a conduit.

21. An apparatus for the method of assessing fluid flow in a conduit as claimed in claim 1.

22. An apparatus as claimed in claim 21, wherein the detector is able to measure the velocity of an external surface of the conduit to an accuracy of +/−20 nm/s.

23. A method of assessing fluid flow in a conduit, the fluid comprising hydrocarbons, the method comprising the steps of:
   (a) measuring optical variances resulting from at least one circumferential mode of vibration of the conduit at a single location on the conduit by directing a monochromatic light source onto an external surface of the conduit and detecting light to provide a measured vibration of the conduit as a result of fluid flow in the conduit; and
   (b) assessing the fluid flow in the conduit using the measured vibration of the conduit.

24. A method of assessing fluid flow in a conduit, the fluid comprising hydrocarbons, the method comprising the steps of:
   (a) measuring optical variances resulting from at least one circumferential mode of vibration of the conduit by directing a monochromatic light source onto an external surface of the conduit and detecting a passive light signal to provide a measured vibration of the conduit as a result of fluid flow in the conduit;
   (b) processing the passive light signal to convert it into the frequency domain;
   (c) producing a graphical output including a series of spikes of amplitude frequency occurring at natural frequencies which represent the modes of circumferential vibration; and
   (d) assessing the fluid flow in the conduit using the measured vibration of the conduit resulting from at least one circumferential mode of vibration and based on said graphical output.

* * * * *